F. B. ANDERSON.
CENTRIFUGAL DRIER.
APPLICATION FILED MAR. 6, 1917.
1,271,112.
Patented July 2, 1918.
2 SHEETS—SHEET 1.
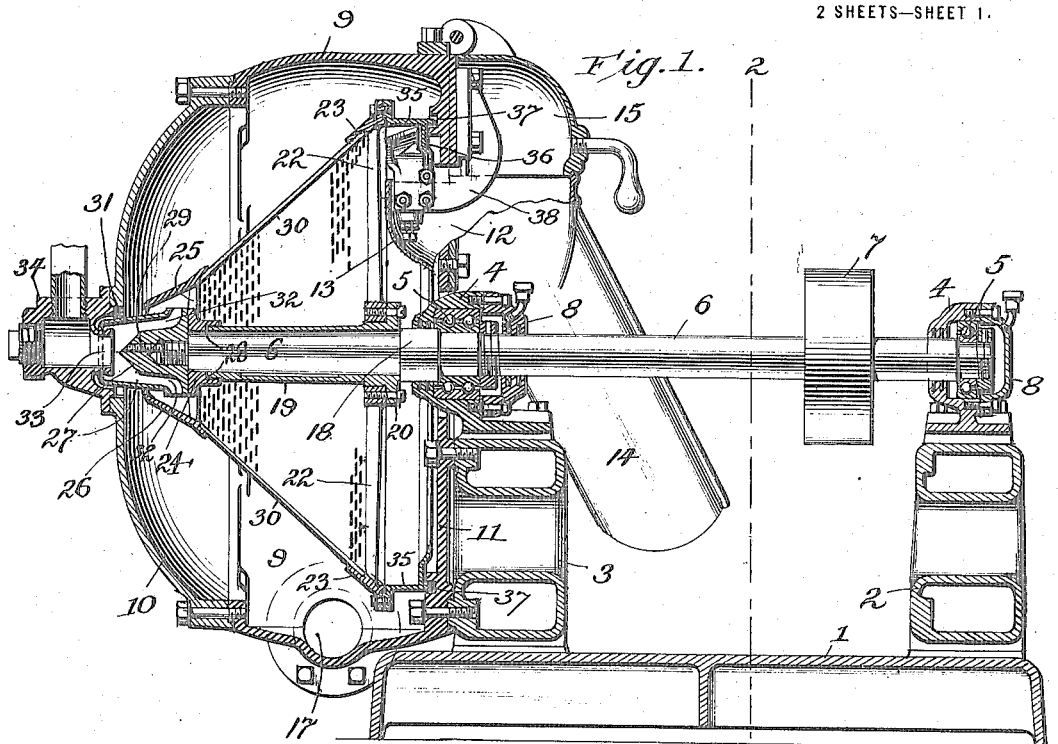
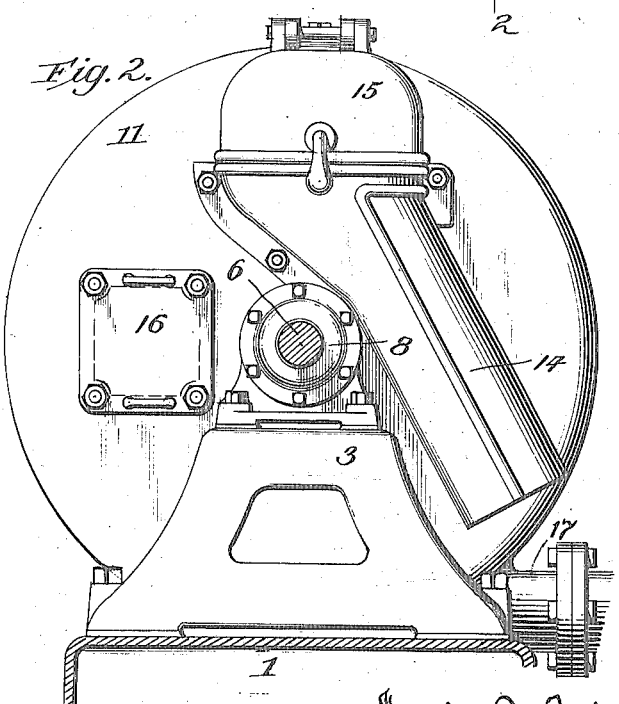
Inventor
Frank B. Anderson
By Dodge and Sons
Attorneys F. B. ANDERSON.
CENTRIFUGAL DRIER.
APPLICATION FILED MAR. 6, 1917.
1,271,112.
Patented July 2, 1918.
2 SHEETS—SHEET 2.
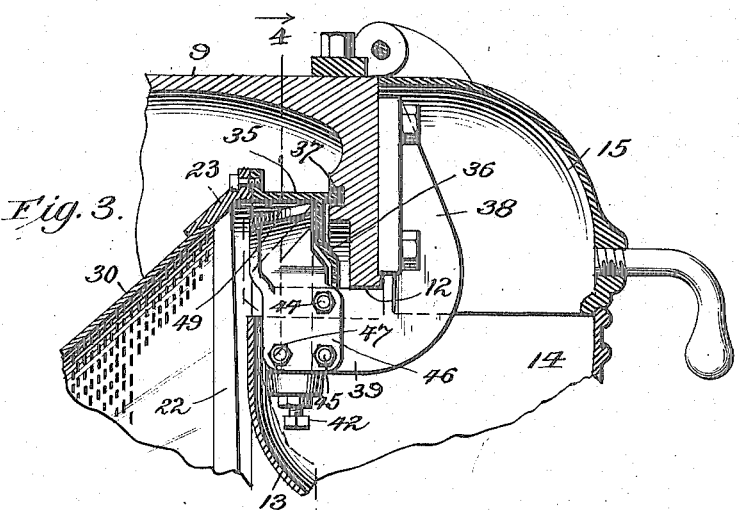
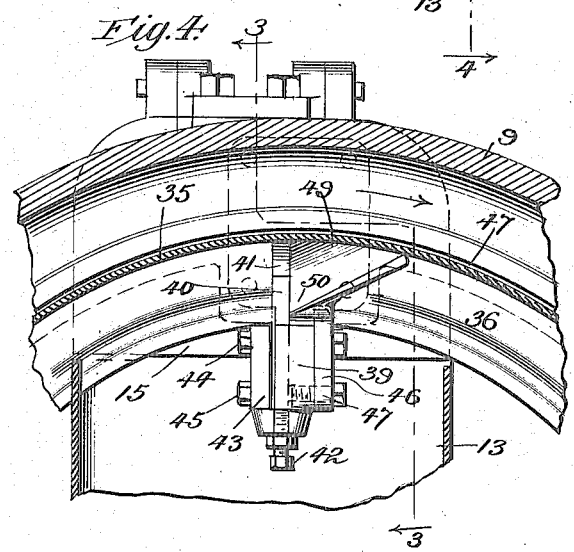
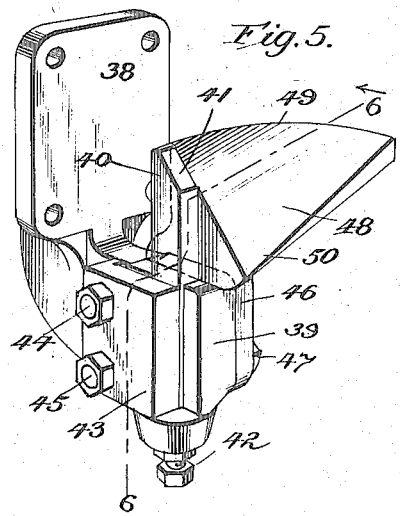
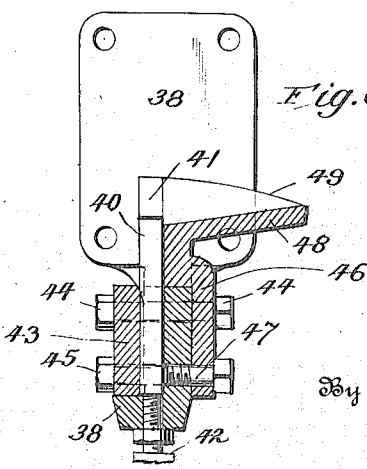
Inventor:
Frank B. Anderson
By Dodge and Sons
Attorneys

UNITED STATES PATENT OFFICE.

FRANK B. ANDERSON, OF CLEVELAND, OHIO, ASSIGNOR OF ONE-THIRD TO CHARLES O. ANDERSON AND ONE-THIRD TO ALBERT D. ANDERSON, BOTH OF CLEVELAND, OHIO.

CENTRIFUGAL DRIER.

1,271,112.  Specification of Letters Patent.  Patented July 2, 1918.

Application filed March 6, 1917. Serial No. 152,822.

*To all whom it may concern:*

Be it known that I, FRANK B. ANDERSON, a citizen of the United States, residing at Cleveland, in the county of Cuyahoga and State of Ohio, have invented a certain new and useful Improvement in Centrifugal Driers, of which the following is a specification.

My present invention pertains to centrifugal driers and has for its object the provision of a simple and effective apparatus which is readily accessible as to its various parts, for the purpose of inspection, cleaning, oiling and the like.

The structure set forth in the present application is, in a sense, an improvement upon the drier shown and claimed in Reissued Letters Patent No. 14,061, dated February 15, 1916.

The drier in its preferred form is illustrated in the annexed drawings, wherein:

Figure 1 is a longitudinal vertical sectional view thereof;

Fig. 2 a transverse sectional elevation, on the line 2—2 of Fig. 1;

Fig. 3 a detail sectional view, on the line 3—3 of Fig. 4, illustrative of the scraper and deflector and the manner in which they are mounted;

Fig. 4 a like view, on the line 4—4 of Fig. 3;

Fig. 5 a perspective view of the supporting bracket for the scraper and deflector, and said elements; and Fig. 6 a sectional view thereof on the line 6—6 of Fig. 5.

In said drawings, 1 denotes a suitable base surmounted by two blocks 2 and 3, preferably formed integral with the base. Blocks 2 and 3 have secured to them housings and supports 4 for bearings, denoted generally by 5, for the horizontally-disposed shaft 6. Said shaft has secured to it a driving pulley 7, and as will be noted upon reference to Fig. 1, said shaft extends outwardly beyond support 4 to a considerable degree. Each support 4 is provided with a removable cover-plate or hood 8, affording ready access to the bearing for adjustment when need be, and likewise excluding foreign matter and retaining the lubricant in and around the bearing.

Secured upon the outer face of block 3 is a bowl or housing, preferably formed of two parts, a ring-shaped member 9 and a cap-shaped member 10, secured to the former and closing the outer end thereof. The inner end of member 9 is closed by a vertically-disposed wall 11, having a centrally-disposed opening into which one end of the adjacent housing 4 extends. Said wall is provided with a second opening 12, in its upper portion, into and through which extends a curved lip 13 of the discharge spout 14 for the dried material. Said spout is bolted to wall 11 and its upper end (outside the wall 11) is closed by a hinged cover 15. A removable plate or door 16 is also preferably provided to cover an opening formed in the wall 11, said opening being provided for cleaning-out purposes and to facilitate inspection of the interior of the machine.

The inner faces of the members 9 and 10 of the liquid collecting bowl are preferably curved, as shown in Fig. 1, and at the lower portion of member 9 there is provided a lateral drainage opening or outlet 17.

Shaft 6, adjacent bearing 5 is provided with an enlargement or shouldered portion 18, and the outer reduced end of the shaft is threaded. A sleeve or quill 19 is mounted on the shaft, the inner end of said quill being formed with a collar or flange 20. A spider frame is secured to said collar, the frame comprising a hub 21, radiating spokes 22, and a rim 23, said rim inclining inwardly toward the threaded end of the shaft.

A second spider frame is mounted on the shaft adjacent its outer end, said frame comprising a hub 24, spokes 25, and a relatively wide rim, 26, which is also inclined in the same general direction as rim 23. A nut-like member 27 is screwed upon the threaded end of shaft 6, the inner face of the nut taking against hub 24 and forcing the same over the adjacent end of quill 19 until the end of the quill abuts a shoulder 28 formed in the bore of the hub. A set-screw 29 is employed to lock the nut in place.

A cone-shaped screen 30, formed of perforated or punched sheet metal or other suitable material, is secured in place between rims 23 and 26, the inner adjacent faces of the screen surface and the rims being flush. In other words, said rims form continuations of the screen, Member 27 extends outwardly through a centrally-disposed opening 31 formed in member 10. The outer end of member 27 is open and hollow, and a series of passages 32 extend inwardly therethrough, said passages turning outwardly and terminating in line with the inner face of rim 26.

A feed nozzle 33 extends into the open end of member 27, said nozzle being formed as a part of a hollow casting 34, secured to the outer face of member 10 around the opening 31.

Bolted to rim 23 of the inner spider frame, is an annular imperforate skirt or screen extension 35, said member having an inwardly-extending flange or shelf 36 which lies in substantial parallelism with wall 11. Said wall is provided on its inner face with an annular groove 37, in which the free end of skirt 35 projects.

Secured to wall 11, above opening 12, is a bracket 38, the lower end 39 whereof extends in through said opening and carries the scraper and deflector for the dried or solid material.

The knife or scraper 40 is formed from a bar of metal and its upper end is inclined, as at 41. The lower portion of the scraper rests in a seat formed in bracket end 39 and its elevation, and consequent position relative to skirt 35, are determined by a set-screw 42. It is maintained in place by a clamp plate 43, which in turn is held in place by two studs 44 and 45, which pass therethrough, through member 39, and the lower arm 46 of the deflector. When the nuts on one or the other end of the studs are turned up the clamp plate is forced inwardly against the scraper and holds it firmly in place. A third stud 47 is screwed into bracket end 39 and passes through arm 46 of the deflector, said stud being arranged adjacent the other edge of the arm from the studs 44 and 45. The nut on this stud may remain tight when the others are loosened to relieve plate 43.

The deflector is of the form best shown in Fig. 5, and comprises a plate-like member 48, the upper edge 49 whereof is formed upon a curve the same as that of the skirt 35. The face of the plate inclines downwardly and inwardly from said upper edge, the inclination being the same as that of the inclined face 41 of the scraper. The deflector is widest adjacent the scraper and tapers off, the lower discharge edge 50 inclining upwardly and merging into the upper curved edge 49.

In operation the shaft 6 is driven at a speed of, say, one thousand revolutions per minute, and consequently the screen is driven at the same rate. The material to be dried is fed in through nozzle 33, and passes thence through passages 32, formed in the member 27. From the mouths of these passages it is thrown outwardly by centrifugal force against the inner face of rim 26, along which it passes to the screen proper. The moisture or fluid content of the material passes through the openings in the screen, being thrown against the wall of the collecting bowl and running down thereon, passes out through opening 17.

The material on the screen surface gradually passes along the same toward the opposite end, the moisture being thrown outwardly therefrom through the screen surface. The dried material passes onto the skirt 35 and is arrested by and banks up against the flange or shelf 36. The scraper cuts into the material adjacent the junction of the skirt and shelf and such loosened material is thrown onto the deflector which causes its discharge into the spout 14. The operation is continuous as long as material is fed to the machine. The speed of rotation of the screen and the dimensions of the screen perforations are dependent on the material undergoing treatment. So too, the knife-adjustment is dependent upon the rapidity with which the dried material banks up on the shelf, a certain amount always being left in order to check the too rapid passage of the material from the screen to the shelf; in other words, the banked material tends to prevent or retard the partially dried material from passing to the shelf from the screen before it is dried.

While in the generic idea the present machine is the same as that disclosed and claimed in the patent aforesaid, the present structure is advantageous from many points of view, among which are that it takes less power to operate, is easier to unload, is cheaper to construct, and more durable in operation.

Having thus described my invention, what I claim is:

1. In a centrifugal drier, the combination of a horizontally-disposed shaft; a cone-shaped screen rotatable therewith; a casing surrounding the screen and having an off-take for the moisture; means for feeding the material to be dried to the smaller end of the screen; means for arresting the dried material at the opposite end of the screen; a discharge spout leading from the casing; and means for continuously removing the dried material and discharging it into the spout.

2. In a centrifugal drier, the combination of a horizontally-disposed shaft; a cone-shaped screen rotatable therewith; a bowl-shaped casing surrounding the same and provided with a discharge outlet for moisture; means for feeding material to be dried to the smaller end of the screen; means at the opposite end of the screen for arresting the dried material; a spout extending through an opening in the upper part of the casing and terminating within the screen; and means located adjacent such spout end for removing the dried material from the screen as the same is rotated and delivering it into the spout.

3. In a centrifugal drier, the combination of a horizontally-disposed shaft; a cone-shaped screen carried thereby; a casing surrounding the screen; means for feeding material to be dried to the smaller end of the screen; means for arresting the dried material at the opposite end of the screen; a scraper working in conjunction with said means to continuously remove the dried material; and a deflector for the removed material located adjacent said scraper.

4. In a centrifugal drier, the combination of a horizontally-disposed shaft; a cone-shaped screen rotatable therewith; a moisture-collecting casing surrounding the same; means for introducing the material to be dried at the smaller end of the screen; a shelf extending inwardly at the larger end of the screen; a knife having an inclined end located adjacent said shelf; and a deflector arranged beside the knife.

5. In a centrifugal drier, the combination of a horizontally-disposed shaft; a cone-shaped screen rotatable therewith; an inwardly extending shelf located at the larger end of the screen; a knife adjustably mounted on a fixed support, said knife extending inwardly alongside of the shelf; and a deflector located adjacent the knife.

6. In a centrifugal drier, the combination with a horizontally-disposed shaft having a shoulder thereon and a threaded end; a screen comprising two spider frames, an interposed foraminous body, and a quill; a member provided with feed openings formed therein screwed upon the shaft and holding the quill and frames in place; and means located at the discharge end of the screen for removing the dried material therefrom.

7. In a centrifugal drier, the combination of a base; a horizontally-disposed shaft supported thereon; a cone-shaped screen mounted on one end of said shaft; a bowl-shaped housing surrounding the screen; a shelf extending inwardly from the larger end of the screen; a bracket secured to the housing and extending inwardly into the screen; a knife carried by the bracket and extending along the shelf; a deflector for the material loosened by the knife, said deflector likewise being carried by the bracket; and means for feeding wet or moist material to the smaller end of the screen.

8. In a centrifugal drier, the combination of a shaft; a cone-shaped screen rotatable therewith; a shelf located at the larger end of the screen, fixed thereto and rotatable therewith; a casing surrounding the screen; means for feeding the material to be dried to the smaller end of the screen; a knife mounted upon a fixed support adjacent the shelf; a deflector for the material removed by the knife; and means for adjusting said knife outwardly and inwardly toward and from the screen.

9. In a centrifugal drier, the combination of a horizontally disposed shaft; a cone-shaped screen rotatable therewith; a casing surrounding the screen and having an offtake for the moisture at the lower end thereof; a discharge spout for the dried material, said spout opening into the upper portion of the casing; a shelf secured to the larger end of the screen and rotatable therewith; a fixed support extending into the casing and in line with the larger end of the screen; a deflector mounted upon the support; and a knife likewise mounted upon the support and serving to remove the dried material as it accumulates upon the shelf.

10. In a centrifugal drier, the combination of a horizontally disposed shaft; a cone-shaped screen rotatable therewith; a casing surrounding the screen and having an offtake for the moisture at the lower end thereof; a discharge spout for the dried material, said spout opening into the upper portion of the casing; a shelf secured to the larger end of the screen and rotatable therewith; a fixed support extending into the casing and in line with the larger end of the screen; a deflector mounted upon the support; a knife likewise mounted upon the support and serving to remove the dried material as it accumulates upon the shelf; and means for adjusting the knife whereby the same may be positioned with relation to the shelf and proper removal of the dried material effected according to the degree of rapidity with which it accumulates upon the shelf.

11. In a centrifugal drier, the combination of a shaft; a cone-shaped screen mounted thereon; means for rotating the same; a shelf extending inwardly from the larger end of the screen; a fixed support; a deflector mounted upon said support and lying adjacent the shelf; and a knife likewise carried by the fixed support and standing forwardly of the deflector.

In testimony whereof I have signed my name to this specification.

FRANK B. ANDERSON.